US 9,289,856 B2

(12) United States Patent
Shaw et al.

(10) Patent No.: US 9,289,856 B2
(45) Date of Patent: Mar. 22, 2016

(54) CREATION OF LASER-DEFINED STRUCTURES ON PRESSURE RELIEF DEVICES VIA TILING METHOD

(71) Applicant: Fike Corporation, Blue Springs, MO (US)

(72) Inventors: Bon F. Shaw, Blue Springs, MO (US); Joe Walker, Kansas City, MO (US); Michael D. Krebill, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 434 days.

(21) Appl. No.: 13/953,280

(22) Filed: Jul. 29, 2013

(65) Prior Publication Data

US 2015/0028006 A1    Jan. 29, 2015

(51) Int. Cl.
| | |
|---|---|
| *B23K 26/359* | (2014.01) |
| *B23K 26/364* | (2014.01) |
| *B23K 26/36* | (2014.01) |
| *F16K 17/16* | (2006.01) |
| *B65D 90/36* | (2006.01) |

(52) U.S. Cl.
CPC ............ *B23K 26/365* (2013.01); *B23K 26/352* (2015.10); *B23K 26/359* (2015.10); *B23K 26/362* (2013.01); *B23K 26/364* (2015.10); *F16K 17/16* (2013.01); *B65D 90/36* (2013.01)

(58) Field of Classification Search
CPC .. B23K 26/352; B23K 26/359; B23K 26/364; B65D 90/36; F16K 17/16
USPC .......... 219/121.69, 121.68; 137/15.18, 68.19, 137/68.23, 68.27; 220/89.2; 222/54, 541.3, 222/541.4; 251/1.2
See application file for complete search history.

(56) References Cited

U.S. PATENT DOCUMENTS

| | | | |
|---|---|---|---|
| 5,058,413 | A | 10/1991 | Muddiman |
| 5,467,886 | A | 11/1995 | Hinrichs |
| 5,571,429 | A | 11/1996 | Smith et al. |
| 6,208,439 | B1 | 3/2001 | McArthur et al. |
| 6,321,582 | B1 | 11/2001 | Cullinane et al. |
| 6,349,737 | B2 | 2/2002 | Middiman et al. |
| 7,600,527 | B2 | 10/2009 | Shaw et al. |
| 7,735,671 | B2 | 6/2010 | Eijkelenberg et al. |
| 7,870,865 | B2 | 1/2011 | Mattison |
| 8,091,574 | B2 | 1/2012 | Melrose et al. |

(Continued)

FOREIGN PATENT DOCUMENTS

WO    2013107858    7/2013

OTHER PUBLICATIONS

The International Search Report and Written Opinion dated Oct. 23, 2014, in the corresponding PCT/US2014/046727 application filed Jul. 15, 2014.

*Primary Examiner* — Samuel M Heinrich
(74) *Attorney, Agent, or Firm* — Hovey Williams LLP

(57) ABSTRACT

Methods of creating various laser-defined control structures on pressure relief devices are provided that utilize a laser having a field of view that is smaller than the overall dimensions of the laser-defined structure to be milled into the pressure relief device. The methods generally involve partitioning the working surface of the device into a plurality of tiles within which a particular segment of the control structure will be milled. Upon milling of a control structure segment in one tile, the pressure relief device and/or laser is repositioned so that a control structure segment in another tile may be created.

24 Claims, 9 Drawing Sheets

(56) References Cited

U.S. PATENT DOCUMENTS

| | | |
|---|---|---|
| 8,333,212 B2 | 12/2012 | Shaw et al. |
| 2005/0130390 A1* | 6/2005 | Andrews ............ B23K 26/0057 438/458 |
| 2006/0237457 A1 | 10/2006 | Shaw et al. |
| 2008/0202595 A1* | 8/2008 | Melrose .............. F16K 17/1606 137/68.23 |
| 2009/0302035 A1* | 12/2009 | Shaw ........................ B23C 3/34 220/89.2 |
| 2010/0140238 A1* | 6/2010 | Mozley .............. B23K 26/0622 219/121.72 |
| 2010/0140264 A1 | 6/2010 | Hernandez |
| 2010/0224603 A1 | 9/2010 | Modena et al. |
| 2010/0322454 A1* | 12/2010 | Ambrose ............. H04R 1/1016 381/380 |
| 2012/0012571 A1 | 1/2012 | Modena et al. |

\* cited by examiner

CREATION OF LASER-DEFINED STRUCTURES ON PRESSURE RELIEF DEVICES VIA TILING METHOD

BACKGROUND OF THE INVENTION

The present invention is generally directed toward methods of creating various laser-defined structures on pressure relief devices, namely those that comprise a rupturable member. In particular, the methods utilize a laser having a field of view that is smaller than the overall dimensions of the laser-defined structure to be milled into the pressure relief device. As a result, the structure must be milled piecemeal via a tiling process. The working surface of the pressure relief device is divided into an assortment of tiles and each tile is individually milled with the laser and/or pressure relief device being shifted in between milling of different tiles. Accordingly, methods of the present invention permit creation of generally large milled structures on the surface of pressure relief device using a laser with a relatively small field of view.

Structures for controlling various operational characteristics of rupture discs, such as opening pressure, disc reversal pressure, and disc petal geometry, have been created through various machining techniques. Traditionally, these control structures, such as lines of disc opening, have been created by contacting the surface of the disc with a die resulting in the displacement of metal in the area of contact with the die and formation of a "score" line. The die-scoring methods typically do not result in removal of metal from the disc, but rather a change in the metallic grain structure in the area of die contact. Generally, this change involves a compression and work hardening of the disc metal. This work hardening can increase the brittleness of the metal and create stress zones. The brittleness and stress zones limit the service life of the pressure relief device as a result of fatigue cracking and stress corrosion. Additionally, it is difficult to achieve a high degree of control over the depth of the score in disc manufacturing, given that the die itself becomes worn during the scoring process and must be periodically replaced. This lack of control imparts a degree of unpredictability into the disc opening characteristics.

In order to avoid the issues with die scoring, alternate processes have been devised to form lines about which the rupture disc opens. One such process is described in U.S. Pat. No. 7,600,527, which discloses forming a line of weakness through an electropolishing method. In this process, a rupture disc is provided with a layer of resist material. A laser is then used to remove a portion of the resist material corresponding to the desired line of weakness. Next, the disc undergoes an electropolishing operation to remove metal from the surface of the disc thereby forming a line of weakness having a desired depth. However, controlling the width of the electropolished line of weakness can be difficult, particularly if the disc material is relatively thick and requires extended electropolishing times in order to achieve the desired line depth. This characteristic can limit the ability to use this method in forming more complex structures comprising multiple trenches in close proximity to each other.

It has also been suggested to directly use a laser to machine a line of weakness into a rupture disc. U.S. Patent Application Publications 2010/0140264 and 2010/0224603 are exemplary in this regard. Also exemplary of the use of lasers to create various control structures in pressure relief devices are U.S. Provisional Patent Application No. 61/720,800, filed Oct. 13, 2012, and entitled "Pressure Relief Device Having Laser-Defined Line of Opening," U.S. patent application Ser. No. 13/552,165, filed Jul. 18, 2012, entitled "Rupture Disc Having Laser-Defined Reversal Initiation and Deformation Control Features," and U.S. patent application Ser. No. 13/780,729, filed Feb. 28, 2013, and entitled "Rupture Disc Having Laser-Defined Line of Weakness with Disc Opening and Anti-Fragmentation Control Structures," all of which are hereby incorporated by reference in their entireties. However, heretofore, the practice of laser machining of disc control structures has been practically limited to rupture discs of a certain size based upon the field of view of the laser used in the machining process.

All scanning lasers comprise optics (apertures, lenses, etc.) that establish an operational field of view. The operational field of view is essentially the working range of the laser across any given substrate, and particularly the maximum space, as measured in degrees or units of distance, between areas that can be machined when the laser and working surface are fixed in position relative to each other. It has generally been considered undesirable to effect any relative shifting between the laser and/or rupture disc during laser milling operations. Because these laser milling operations involve removal of some, but not all, disc material on any particular location of the rupture disc, precise control over the depth of material removal is an important aspect of the milling operation. The depth of material removal is dependent generally on the total amount of energy supplied by the laser that impinges upon any particular point of the working surface. The more ablative energy that is supplied by the laser the greater the depth of the control structure that is created.

In order to avoid creation of heat affected zones within the disc material, and in order to achieve the desired depth of disc material removal, laser milling of the disc control structures often occurs as a plurality of successive passes of the laser beam across the surface of the disc. Care must be taken in plotting the laser paths followed during these passes so that the laser beam does not inadvertently impinge upon a point of the disc surface more times than is required to achieve the desired depth. If the laser beam were permitted to deliver a greater than desired amount of energy to a particular point, such as at the intersection of transverse lased trenches, the depth of material removal at the point of intersection may be greater than desired, and in some instances may penetrate through the disc material entirely. In order to avoid these concerns, relative movement between the laser and the working surface has been prohibited, as the relative repositioning of the laser and working surface increases the risk of removing a greater amount of disc material than desired, possibly leading to undesirable disc control characteristics. In a practical sense, this means that the entire control structure being milled in the disc must reside within the field of view of the scanning laser being used.

Generally, the larger the field of view of the laser, the more expensive the laser is. Accordingly, the capital costs associated with laser acquisition generally restrict laser milling of control features to small-diameter rupture discs. There are many industrial applications for large-diameter pressure relief devices, including large-diameter rupture discs and explosion vents, that would benefit from the use of control structures such as those described in the above-listed references. However, laser milling of large-scale control features has been limited because of the inability to conduct milling operations in such a pressure relief device beyond the field of view of the laser.

SUMMARY OF THE INVENTION

The present invention overcomes these problems and provides methods for creating pressure-relief device control structures that are of larger size than the field of view of the particular laser being used in the milling operation.

According to one embodiment of the present invention there is provided a method of creating a laser-defined control structure in a pressure relief device, the control structure comprising a plurality of control structure segments. The method comprises providing a pressure relief device comprising a pair of opposed faces, a central section and an outer flange section in surrounding relationship to said central section. At least a portion of one of the faces of the pressure relief device is partitioned into a plurality of tiles, at least two of which correspond to areas of the one face in which the control structure segments are to be located. A laser beam generated by a scanning laser is passed over the area of the one face corresponding to one of the tiles thereby forming one of the control structure segments. Subsequently, the relative position of the laser and the pressure relief device is shifted, and the laser beam is passed over the area of the one face corresponding to another of the tiles thereby forming another of the control structure segments.

In another embodiment of the present invention, there is provided a method of creating a laser-defined control structure in a pressure relief device, the control structure comprising a plurality of control structure segments. The method comprises providing a pressure relief device comprising a pair of opposed faces, a central section and an outer flange section in surrounding relationship to the central section. At least a portion of one of the faces of the pressure relief device is partitioned into a plurality of tiles, at least two of the tiles correspond to areas of the one face in which the control structure segments are to be located. A laser beam generated by a scanning laser is passed over the area of the at least two tiles thereby forming the control structure segments. The scanning laser has a field of view that is less than the distance between the two most distant points on the control structure. The passing step results in the formation of a intermediate region between adjacent control structure segments. The intermediate region corresponds to a boundary between adjacent tiles and has a pressure relief device material thickness that is greater than the pressure relief device material thickness at the deepest point of either of the adjacent control structures.

DETAILED DESCRIPTION OF THE PREFERRED EMBODIMENT

The following description is provided with reference to certain exemplary embodiments of the present invention. It is to be understood, however, that this description is provided by way of illustration and nothing therein should be taken as a limitation upon the overall scope of the invention.

Figure 1:
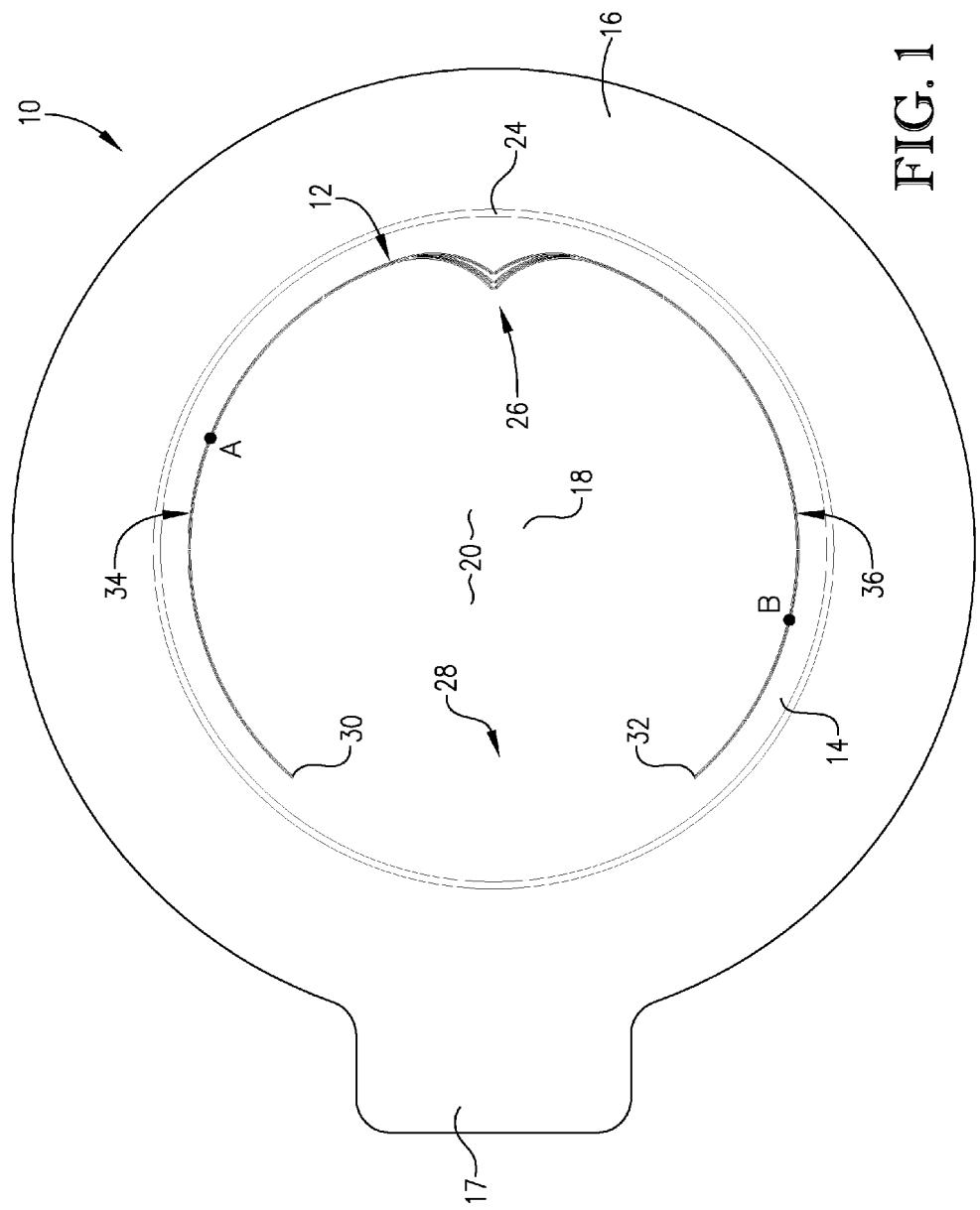
FIG. 1 is a plan view of a pressure-relief device having a laser-defined line of opening created by a tiled milling operation in accordance with one embodiment of the present invention.

Turning to FIG. 1, a pressure relief device 10 having a laser-defined control structure 12 formed thereon is shown. As depicted, pressure relief device 10 is in the form of a circular disc; however, it is within the scope of the present invention for device 10 to assume other shapes and configurations such as a rectangular vent panel. Moreover, device 10 can be formed from any material including various metals such as stainless steels, Hastalloy, Inconel, titanium, and nickel. Device 10 comprises a central section 14 and an outer flange section 16 in surrounding relationship thereto. Central section 14 generally comprises an overpressure relief area 18 for the device that, upon exposure of the device to an overpressure condition, will rupture and open in relief of the overpressure condition. Flange section 16 is configured to permit device 10 to be mounted for operation, such as in between adjacent pipe sections in the case of a rupture disc, or secured to the wall of a vessel, preferably in conjunction with a mounting frame assembly, not shown, in the case of a vent. Flange section 16 is also provided with a tab 17 to facilitate installation and alignment of device 10 within the apparatus to be protected thereby.

Figure 9:
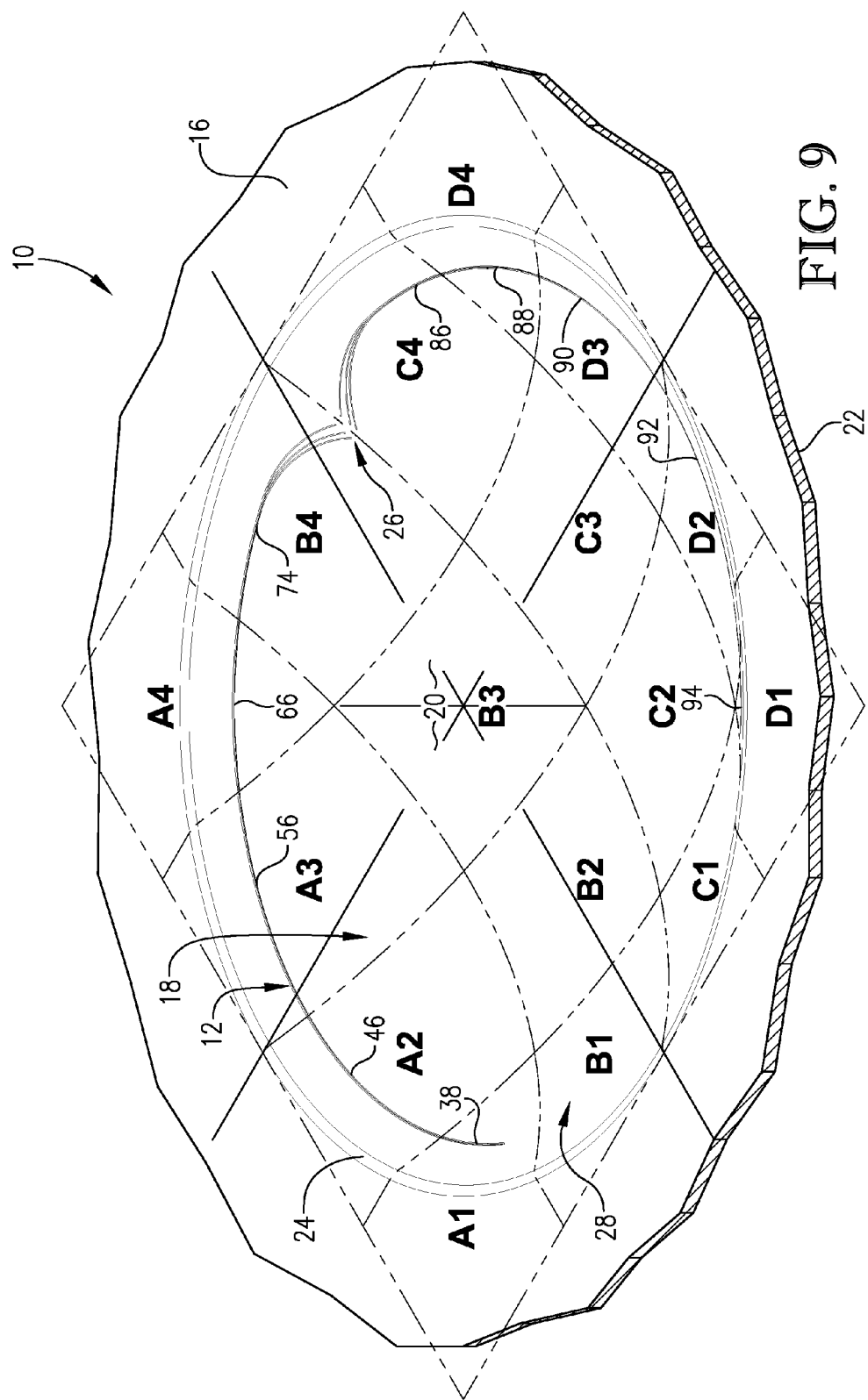
FIG. 9 is a perspective view of the line of opening and respective tiles relative to the contours of the bulged section of the pressure relief device.

Device 10 also comprises a pair of opposed faces 20, 22 (see, FIG. 9). In certain embodiments, central section 14 is bulged and faces 20, 22 comprise concavo-convex portions that correspond to central section 14. In particular embodiments comprising a bulged central section, device 10 may comprise a reverse-acting rupture disc in which opening of the disc is achieved through reversal of the concavity of the bulged section by an overpressure condition. It is also within the scope of the present invention for central section 14 to be flat and substantially co-planar with flange section 16.

Control structure 12 is shown formed in face 20 of device 10, but it is within the scope of the present invention for additional control structures to be formed in the same and/or opposite faces. In addition, control structure 12 is formed in central section 14; however, control structure 12 may be formed in flange section 16, or in the transition region 24 between central section 14 and flange section 16 as required for any particular application. Control structure 12 as illustrated depicts an opening control structure having an opening initiation feature 26 formed opposite of a hinge section 28 defined by opposed end regions 30, 32 of line-of-opening segments 34, 36. Control structure 12 may assume nearly any configuration, geometry, or function depending upon the performance characteristics needed for a given pressure relief application. In certain embodiments, control structure 12 may comprise a "cross" configuration, as illustrated in U.S. patent application Ser. No. 13/552,165, incorporated by reference herein, forming a plurality of petals from the overpressure relief area upon opening of the device. In other embodiments, control structure 12 may comprise a reversal control feature as illustrated in U.S. patent application Ser. No. 13/780,729, incorporated by reference herein, or an anti-fragmentation feature disposed at the ends of line-of-opening segments 30, 32 as illustrated in U.S. patent application Ser. No. 13/780,729. All of the foregoing structures are amenable to being produced according to the methods of the present invention described herein.

Methods according to the present invention are ideally suited for forming control structures 12 in pressure relief devices that have an overall dimension that exceeds the capabilities of the scanning laser such that the complete control structure could not be created without moving the laser or device 10. Accordingly, methods according to the present invention require repositioning of the laser or the device at least once during creation of the control structure. As noted above, repositioning of the laser and/or pressure relief device introduces a risk of unintentionally passing the laser beam over a particular area of the device a greater number of times than otherwise desired thereby resulting in removal of more material from the device than intended. This unintentional removal of material could result in the formation of weakened areas on the pressure relief device thereby affecting the opening characteristics of the device, or the formation of pinholes that extend entirely through the device.

Figure 2:
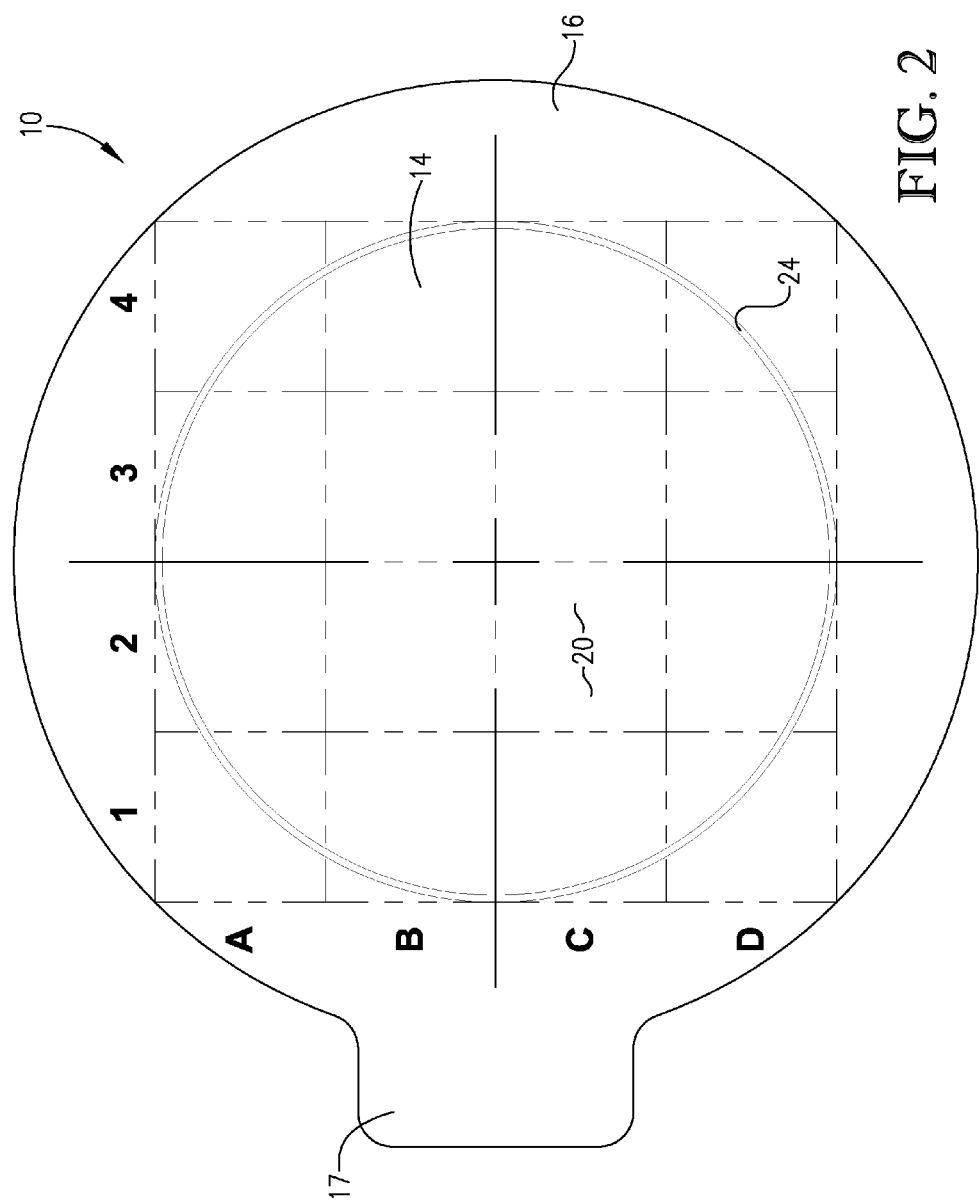
FIG. 2 is a schematic representation of an exemplary tile pattern that may be used in creating a control structure in a pressure-relief device.

In order to avoid these problems, the present invention involves the partitioning of the face of the pressure relief device to be laser milled into a plurality of "tiles" as shown in FIG. 2. Face 20 of device 10 has been partitioned in a grid-like manner with columns designated 1 to 4 and rows designated A-D, thereby forming sixteen tiles of approximately equal dimension (A1, A2, . . . B1, B2, . . . C1, C2, . . . D1, D2 . . . ). It is to be understood that the partitioning of face 20 illustrated in FIG. 2 is exemplary and that it is possible for the partitioning to result in any number of tiles of equal or varying dimension. Moreover, the tiles need not be arranged in a grid-like pattern. It is noted that the partitioning of face 20 may be "virtual" and need not be accompanied by creating physical lines of demarcation on face 20.

In certain embodiments, the individual tiles may be arranged and dimensioned according to the field of view of the laser being used to create control structure 12. For example, assuming that central section 14 has a diameter of eight inches, and that each tile shown is approximately two inches by two inches, the laser used to create control structure 12 must have a linear field of view at least as great as the smallest dimension of the tile (i.e., two inches), and preferably at least as great as the largest dimension of the tile (i.e., approximately 2.83 inches representing the length of the diagonal). However, in order to take advantage of the methods according to the present invention, the tile should be dimensioned so as to avoid having a smallest dimension that is greater than the field of view of the laser being used, otherwise there is a risk that the laser may not be able to fully construct a control structure segment within the tile without repositioning the laser and/or device 10.

Figure 3:
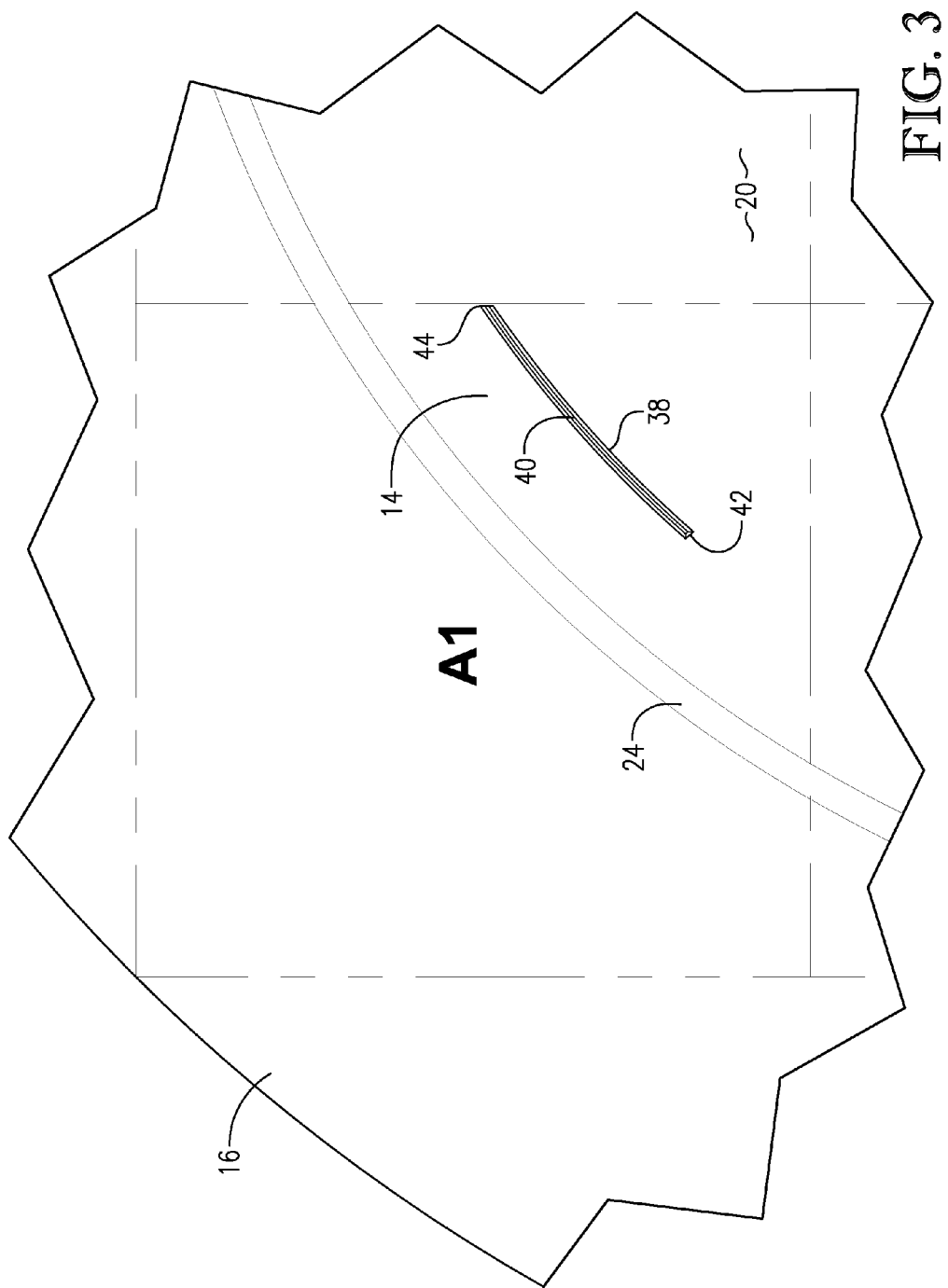
FIG. 3 is a close-up, fragmentary view of a tile and the portion of the line of opening residing within that tile.

Turning to FIG. 3, tile A1 is shown having a control structure segment 38 that has been formed therein by laser removal of material from an area of face 20 within the tile. Segment 38 is arcuate and comprises a trench 40 that extends between ends 42, 44. During formation of segment 38, the laser beam impinges upon face 20 in one or more laser beam passes. In preferred embodiments of the present invention, the laser beam passes are confined to the area of tile A1 during this step and do not cross over into any adjacent tile.

Following creation of segment 38, the relative position of pressure relief device 10 and the laser is changed, either by shifting of the laser, or device 10, or both, so that the laser field of view corresponding with tile A2. The laser beam then travels along a predetermined path across the area of face 20 within tile A2 corresponding with another control structure segment 46. Segment 46 comprises a trench 48 that extends between ends 50, 52.

Figure 4:
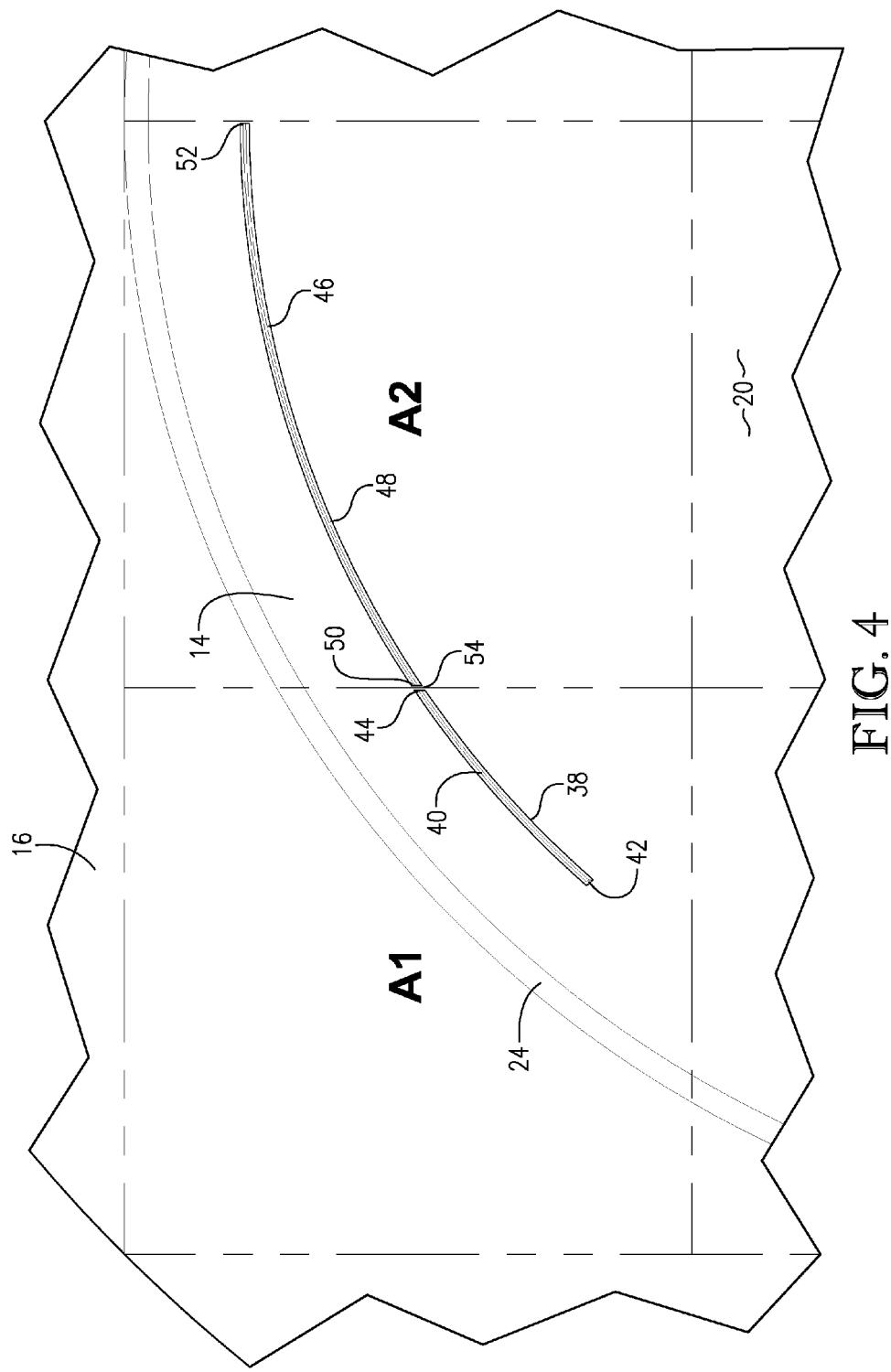
FIGS. 4-7 are close-up, fragmentary views of adjacent tiles and the portions of the line of opening residing within those tiles depicting the sequential milling operations used to create the line of opening of FIG. 1.

As can be seen in FIG. 4, the milling operations performed in tiles A1 and A2 result in the formation of an intermediate region 54 between ends 44 and 50 of the adjacent control structure segments 38, 46. Intermediate region 54 corresponds to and delineates the boundary between adjacent tiles A1 and A2. In certain embodiments, intermediate region 54 has a pressure relief device material thickness that is greater than the pressure relief device material thickness at the deepest point of either of said adjacent control structures. In particular embodiments, intermediate region 54 comprises an unlased area of face 20 located between juxtaposed control structure segments 38, 46. However, it is within the scope of the present invention for intermediate region 54 to have undergone some degree of material removal via laser ablation. This could be accomplished in a number of ways, including through a partial indexing of the laser or device 10 while moving between operations in tiles A1 and A2, or through a reduced number of laser passes that extend entirely up to the boundary between tiles A1 and A2 as compared to a full complement of laser passes used to mill the portion of trench 40 between ends 42, 44, for example. Thus, in any event, the device material thickness at intermediate region 54 is greater than the device material thickness within either of trenches 40, 48. The width of intermediate region 54, that is, the distance between ends 44, 50 is generally short enough so that the added material thickness does not appreciably impact the tearing of central section 14 during opening of device 10 along control structure 12.

Figure 5:
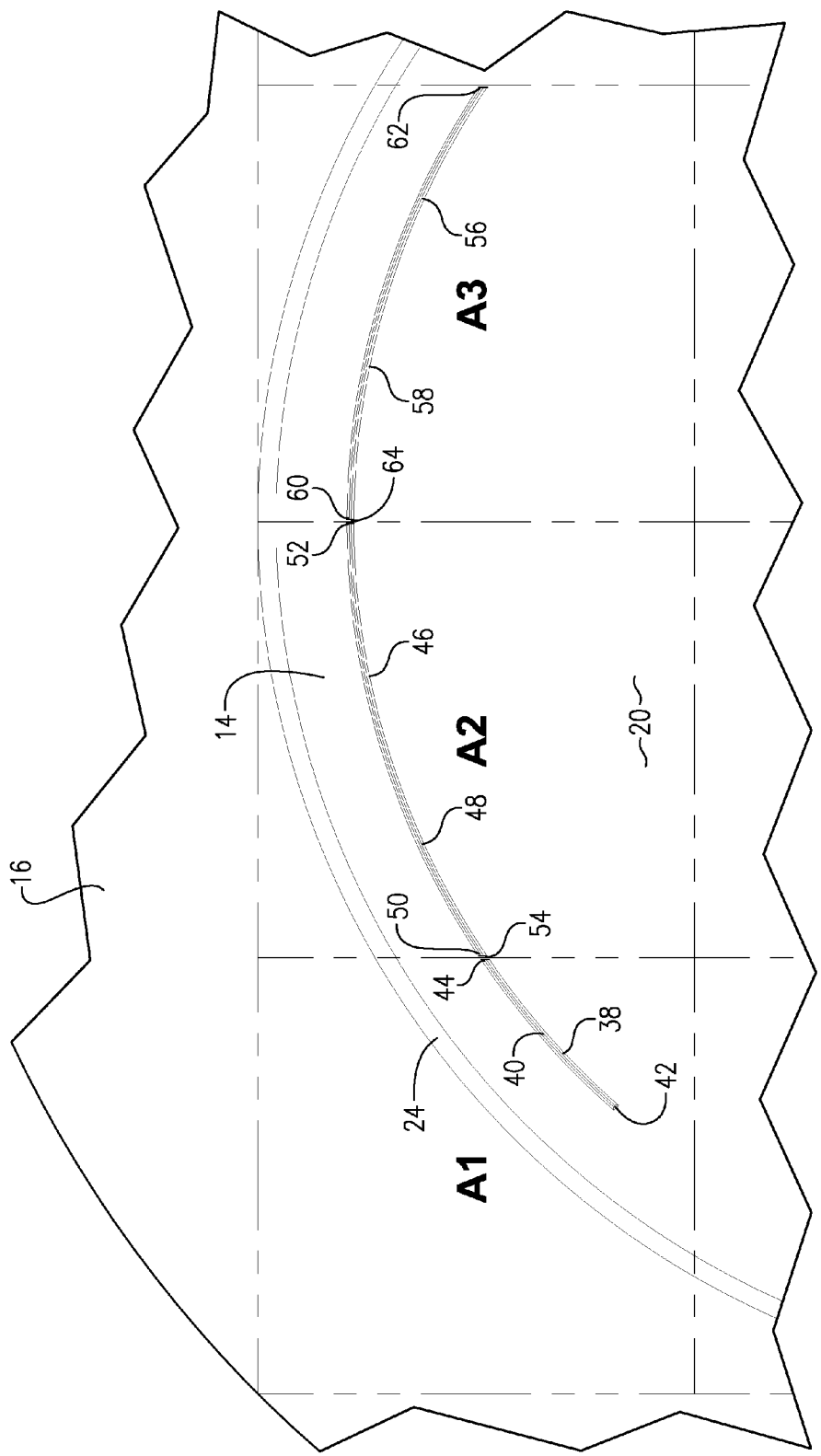

Upon completion of milling operations within tile A2, the laser and/or device 10 are repositioned yet again so as to facilitate milling of control structure segment 56 within tile A3 as shown in FIG. 5. Like control structure segments 38, 46, segment 56 comprises a lased trench 58 disposed between ends 60 and 62. An intermediate region 64 is formed between ends 52, 60 that is similar in configuration to intermediate region 54; although, it is within the scope of the present invention for intermediate regions 54, 64 to be configured differently, e.g., one may be partially lased and the other may be unlased. However, intermediate region 64 generally comprises a material thickness that is greater than the material thickness within either of trenches 48, 58.

Figure 6:
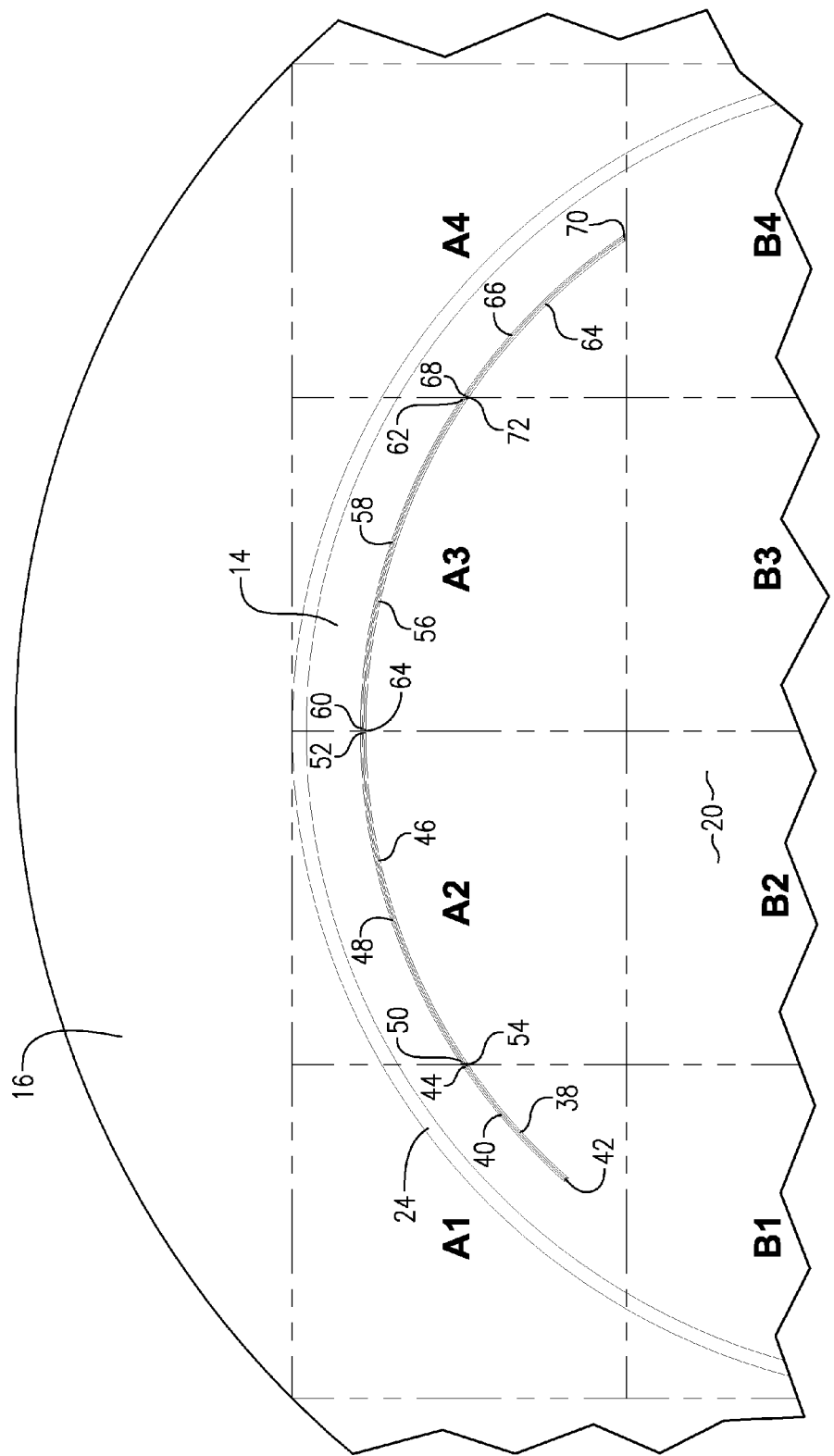
Figure 7:
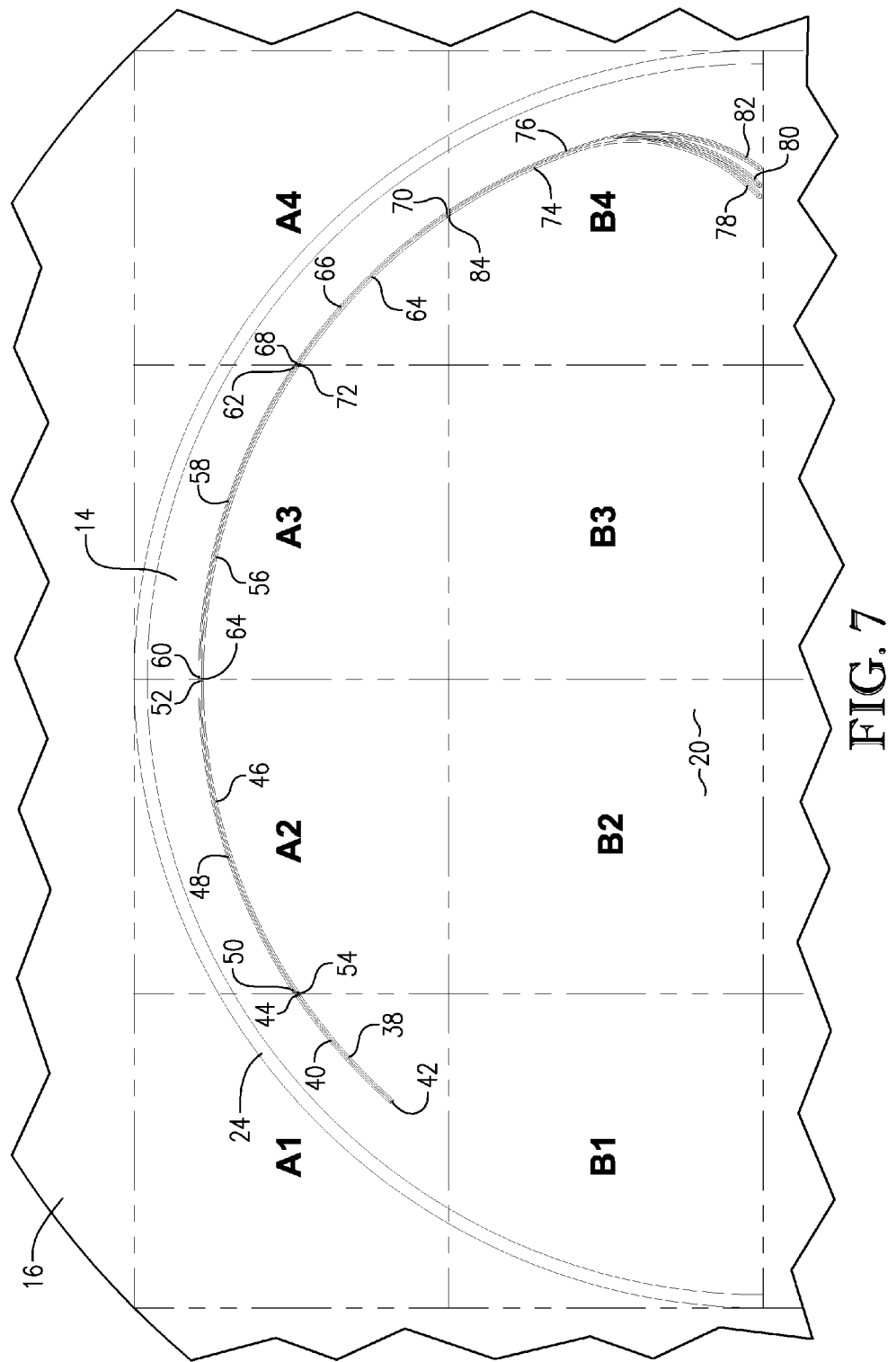

Upon completion of milling operations within tile A3, the laser and/or device 10 are repositioned again so as to facilitate milling of control structure segment 64 in tile A4 as shown in FIG. 6. Segment 64 comprises a lased trench 66 located between ends 68, 70. An intermediate region 72 is formed between ends 62, 68. After milling of segment 64, the laser and/or device 10 are repositioned again for milling of control structure segment 74 within tile B4. Segment 74 comprises a trench 76 that includes diverging trench segments 78, 80, and 82, which cooperate to define part of opening initiation feature 26. Segment 74 includes an end 84 that defines along with end 70 an intermediate region 84.

Figure 8:
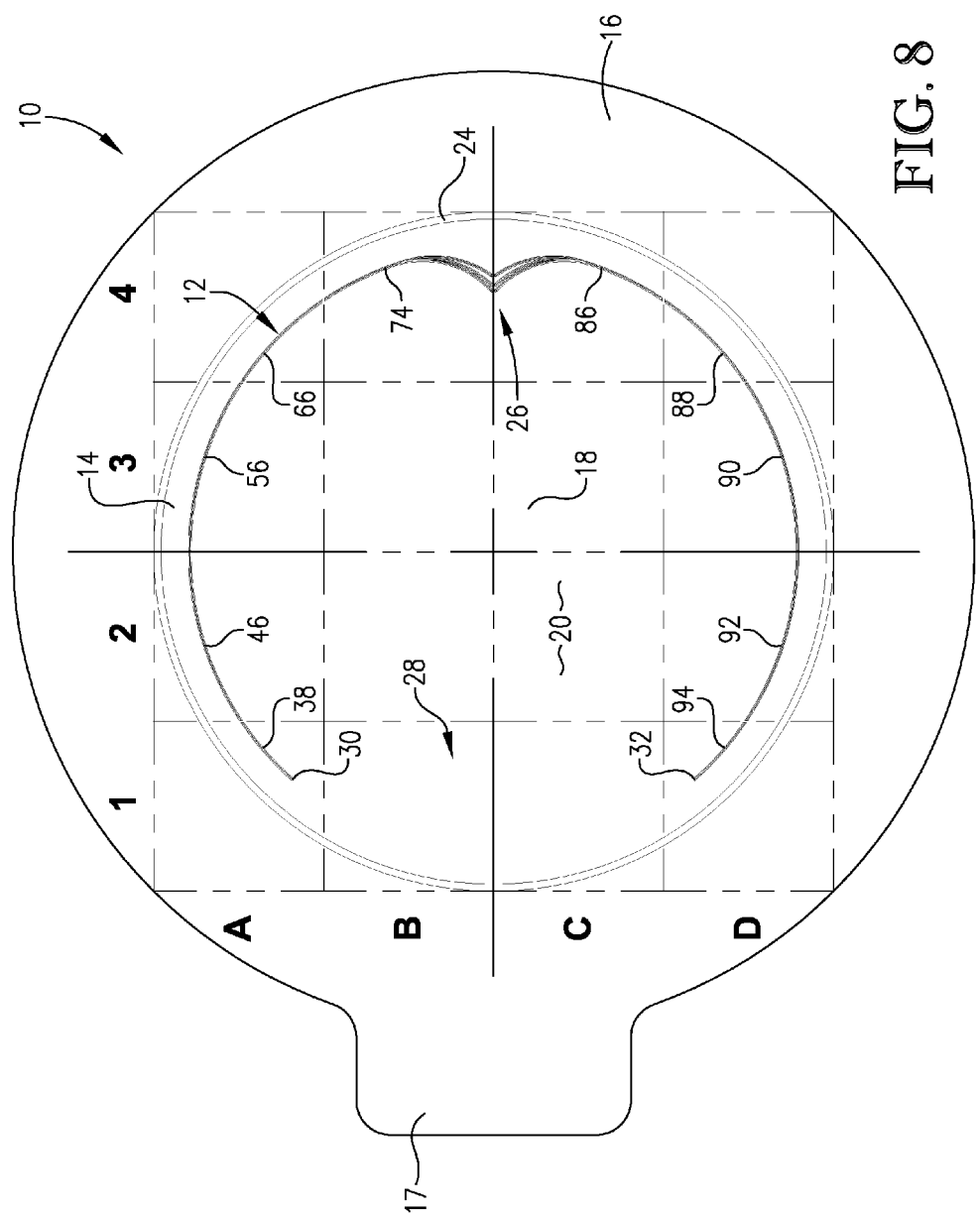
FIG. 8 is a plan view of the completed laser-defined line of opening and the location of the various tiles comprising each line of opening segment.

The remaining control structure segments 86, 88, 90, 92, 94 are created in a similar manner to those segments described above beginning with tile C4, followed by tiles D4 to D1, respectively. FIG. 8 depicts the completed control structure 12, and FIG. 9 further illustrates the completed control structure 12 along with depicting the contours of the various tiles in which the control structure segments are formed. While the above discussion has described "sequential" creation of the various control structure segments making up control structure 12 (i.e., beginning at one end and finishing at the other), it is understood that milling of tiles may occur in any desired sequence, and preferably in the most efficient sequence so as to complete formation of structure 12 in as short a time as possible.

One of skill in the art is capable of selecting an appropriate laser and laser operating parameters depending upon numerous variables such as the pressure relief device material, thickness, and desired processing time. In certain embodiments, a femtosecond laser may be preferred, but laser power, frequency, pulse duration, scanning speed, and spot size of the laser beam can be adjusted for a particular laser milling application. It is generally desirable to select a laser and laser operating parameters so as to avoid creation of heat affected zones within the lased areas of the pressure relief device 10 as heat affected zones could lead to unpredictable operational characteristics. The laser used with the present invention is preferably a scanning laser in which the path of the laser beam is control through the use of the laser's optics (e.g., mirrors and/or lenses) as opposed to active movement of the laser itself. The control of the beam's path and the speed at which the beam moves across the working surface are generally greater with a scanning laser as opposed to flying optic lasers in which the laser beam traverses a predetermined path by physically shifting the position of the laser head.

As noted above, in certain embodiments, the laser selected for the milling operation has a field of view that is generally smaller than the overall dimensions of the control structure to be created. Thus, the field of view of the laser is less than the distance between the two most distant points of the control structure. Turning to FIG. 1, this concept is illustrated by points A and B on control structure 12. Points A and B are diametrically opposed. Employing the concepts of the present invention, it would not be possible for the laser selected to impinge upon both points A and B in any single relative orientation of device 10 and the laser. That is, the field of view of the laser would not permit milling upon both points A and B without repositioning the laser or device 10. In particular embodiments, especially when device 10 is a rupture disc, the central section 14 may have a diameter of between about 2 to about 24 inches, between about 4 to about 20 inches, or between about 8 to about 16 inches, thus the distance between the two most distant points on the control structure 12 may correspond to these ranges, especially if control structure 12 is located near transition region 24. In other embodiments, the distance between the two most distant points on control structure 12 will be at least 2 inches, at least 4 inches, at least 8 inches, or at least 16 inches. In particular embodiments, the laser employed with the present invention has a field of view that is less than 4 inches, less than 3 inches, or less than 2 inches. Alternatively, the laser employed may have a field of view that is between about 1 to about 4 inches, or between about 2 to about 3 inches.

We claim:

1. A method of creating a laser-defined control structure in a pressure relief device, said control structure comprising a plurality of control structure segments, said method comprising the steps of:
    providing a pressure relief device comprising a pair of opposed faces, a central section and an outer flange section in surrounding relationship to said central section;
    partitioning at least a portion of one of said faces of said pressure relief device into a plurality of tiles, at least two of said tiles corresponding to areas of said one face in which said control structure segments are to be located;
    passing a laser beam generated by a scanning laser over the area of said one face corresponding to one of said tiles thereby forming one of said control structure segments; and
    shifting the relative position of said laser and said pressure relief device;
    passing said laser beam over the area of said one face corresponding to another of said tiles thereby forming another of said control structure segments.

2. The method according to claim 1, wherein said pressure relief device central section is bulged, and said pressure relief device faces comprise concavo-convex portions corresponding to said central section.

3. The method according to claim 2, wherein said pressure relief device is a reverse acting rupture disc.

4. The method according to claim 1, wherein said passing steps result in the formation of a intermediate region between adjacent control structure segments, said intermediate region corresponding to a boundary between adjacent tiles.

5. The method according to claim 4, wherein said intermediate region has a pressure relief device material thickness that is greater than the pressure relief device material thickness at the deepest point of either of said adjacent control structures.

6. The method according to claim 4, wherein said intermediate region comprises an unlased area.

7. The method according to claim 1, wherein the laser beam of each passing step impinges upon said one face of said pressure relief device in only one tile and does not cross over into an adjacent tile.

8. The method according to claim 1, wherein said laser has a field of view that is less than the distance between the two most distant points of said control structure.

9. The method according to claim 8, wherein said laser field of view is less than 4 inches.

10. The method according to claim 8, wherein the distance between the two most distant points of said control structure is greater than 4 inches.

11. The method according to claim 1, wherein said control structure is a line of opening formed in said central section.

12. The method according to claim 11, wherein said line of opening comprises at least one of an opening initiation feature and an anti-fragmentation feature.

13. The method according to claim 1, wherein said control structure is a reversal initiation feature.

14. A method of creating a laser-defined control structure in a pressure relief device, said control structure comprising a plurality of control structure segments, said method comprising the steps of:
    providing a pressure relief device comprising a pair of opposed faces, a central section and an outer flange section in surrounding relationship to said central section;
    partitioning at least a portion of one of said faces of said pressure relief device into a plurality of tiles, at least two of said tiles corresponding to areas of said one face in which said control structure segments are to be located; and
    passing a laser beam generated by a scanning laser over the area of said at least two tiles thereby forming said control structure segments,
    said scanning laser having a field of view that is less than the distance between the two most distant points on said control structure,
    said passing step resulting in the formation of a intermediate region between adjacent control structure segments, said intermediate region corresponding to a boundary between adjacent tiles and having a pressure relief device material thickness that is greater than the pressure relief device material thickness at the deepest point of either of said adjacent control structures.

15. The method according to claim 14, wherein said pressure relief device central section is bulged, and said pressure relief device faces comprise concavo-convex portions corresponding to said central section.

16. The method according to claim 15, wherein said pressure relief device is a reverse acting rupture disc.

17. The method according to claim 14, wherein said intermediate region comprises an unlased area.

18. The method according to claim 14, wherein said passing step comprises passing said laser beam over the area of said one face corresponding to one of said tiles to form one of said control structure segments, shifting the relative position of said laser and said pressure relief device, and passing said laser beam over the area of said one face corresponding to one other of said tiles to form one other of said control structure segments.

19. The method according to claim 18, wherein during said passing step said laser beam does not pass from one tile into an adjacent tile.

20. The method according to claim 14, wherein said laser field of view is less than 4 inches.

21. The method according to claim 14, wherein the distance between the two most distant points of said control structure is greater than 4 inches.

22. The method according to claim 14, wherein said control structure is a line of opening formed in said central section.

23. The method according to claim 22, wherein said line of opening comprises at least one of an opening initiation feature and an anti-fragmentation feature.

24. The method according to claim 14, wherein said control structure is a reversal initiation feature.

\* \* \* \* \*